Patented Oct. 25, 1927.

1,646,657

UNITED STATES PATENT OFFICE.

CHARLES J. O'CONNELL, OF DEER WOOD, MINNESOTA, ASSIGNOR OF ONE-HALF TO WALTER S. HARRIS, OF MINNEAPOLIS MINNESOTA.

HONEY FOOD PRODUCT.

No Drawing. Application filed September 7, 1926. Serial No. 134,132.

This invention relates to a new food product made from honey and to the process of manufacturing the same.

Honey in its natural state, either in the comb or strained honey has always had certain objectionable features which prevented it from being a staple product for marketing. Natural honey if exposed to air for any considerable period of time will crystallize and thicken, reducing the pleasantness of the taste, the appearance of the product, as well as reducing its adaptability for consumption with bread. Natural honey is not only difficult to spread on bread but moreover, is very adhesive and will adhere to a knife or spoon and often drip in much the same manner as thick molasses.

It is the main object of my invention to provide a new and highly improved honey product composed for the most part of natural honey and in the form of a colloid, which will not be subject to crystallization or deterioration when exposed to air, and which, moreover, may be spread on bread or other food with facility.

Another object is to provide a simple and improved process for manufacturing a honey food product based on the principle of converting natural honey into a colloid state.

A further object is to provide a new honey food product and a simple but efficient process for manufacturing the same which will preserve the natural nectars and flavors of honey and produce a product pleasant in taste, attractive in appearance and in a colloidal condition, eliminating the objections to natural honey as commercially sold at this time.

These and other objects of the invention will be apparent from the following description.

My invention stated contemplates the production of honey in a semi-solid or colloidal state, using as ingredients a relatively large amount of natural honey preferably in strained or extracted form and a relatively small amount of a colloid producing substance which when mixed and treated in the process to be hereinafter described, result in producing a transparent non-crystalline semi-solid colloid.

Some organic edible colloid forming substance is utilized, such as agar-agar, which when mixed with honey and treated under my process gives excellent results.

In carrying out the manufacture of my product I prefer to heat a mass of extracted or strained honey to a temperature between 80 and 118 degrees centigrade. The boiling point of honey is approximately 118 degrees centigrade, and in manufacturing this food product it is highly desirable to preserve the natural nectars and flavors of the honey. Since it is not necessary to boil the ingredients for my product, this can be done. A relatively small amount of concentrated aqueous solution of agar is then poured into the receptacle containing the heated honey and the mass agitated. Small amounts of water may be added, and will tend to make a more solid product up to a certain point, although water may be eliminated, if desired, the honey supplying sufficient water to convert the mass into a colloid. I prefer to heat the agar solution to a temperature substantially equal to the temperature of the honey before mixing the ingredients to obtain a more complete colloidal solution. After the mass has been sufficiently agitated the same may be poured into molds for hardening. The mass will set in a relatively short time, forming a transparent semi-solid colloidal product of considerable consistency capable of being cut or sliced.

The above described steps in manufacturing the desired product are preferably employed although the product may be formed without heating the ingredients if the honey, water and colloid forming substance are put in a colloid machine and agitated violently for a considerable period.

The amounts of the ingredients may be varied considerably but best results have been obtained from the following proportions:

Honey—70 to 95 percent by weight.
Commercial agar—¼-1% by weight.
Water—0 to 30% by weight.

The food product manufactured in accordance with the process described has the natural honey flavor coupled with a delicacy and lightness that produces a more attractive sensation to the taste than the natural product.

The natural flavors and nectars of the honey as well as the vitamins are preserved in the finished product since the ingredients are only heated slightly in carrying out my process.

The product may be sliced or cut with a knife and will not adhere to the utensil or implement with which it is handled.

Tests have conclusively shown that the product may be exposed to air indefinitely without crystallization or deterioration.

It will, of course, be understood that I do not in any way limit myself to the exact proportions of the ingredients disclosed herein or to the use of agar as the colloid producing substance.

What is claimed is:

1. A colloidal substantially solidified food product composed of a relatively large amount of natural honey and a relatively small amount of an organic edible colloid forming substance.

2. A colloidal substantially solidified food product composed of a relatively large amount of natural honey, a relatively small amount of an organic edible colloid forming substance, and a relatively small amount of water.

3. A colloidal substantially solidified food product composed of a relatively large amount of natural honey, and a relatively small amount of agar.

4. The process of manufacturing a colloidal food product which consists in heating a relatively large amount of natural honey, adding a relatively small amount of an organic edible colloid forming substance and permitting the resultant mass to solidify in colloidal state.

5. The process of manufacturing a food product which consists in adding a relatively small amount of an organic edible vegetable colloid forming substance to a mass of natural honey, thoroughly mixing said ingredients and pouring the resultant mass into moulds for substantial solidification in colloidal state.

In testimony whereof I affix my signature.

CHARLES J. O'CONNELL.